United States Patent
Beristany et al.

(10) Patent No.: US 12,074,418 B2
(45) Date of Patent: Aug. 27, 2024

(54) ROUND ADJUSTABLE MUD RING ASSEMBLY

(71) Applicant: Hubbell Incorporated, Shelton, CT (US)

(72) Inventors: Victor Beristany, South Bend, IN (US); Krzysztof Wojciech Korcz, Granger, IN (US)

(73) Assignee: HUBBELL INCORPORATED, Shelton, CT (US)

( * ) Notice: Subject to any disclaimer, the term of this patent is extended or adjusted under 35 U.S.C. 154(b) by 214 days.

(21) Appl. No.: 17/367,894

(22) Filed: Jul. 6, 2021

(65) Prior Publication Data
US 2022/0006274 A1    Jan. 6, 2022

Related U.S. Application Data

(60) Provisional application No. 63/048,511, filed on Jul. 6, 2020.

(51) Int. Cl.
*H02G 3/08* (2006.01)
*F16M 11/04* (2006.01)
*H02G 3/12* (2006.01)

(52) U.S. Cl.
CPC .......... *H02G 3/081* (2013.01); *F16M 11/043* (2013.01); *H02G 3/12* (2013.01)

(58) Field of Classification Search
CPC ............ H02G 3/08; H02G 3/081; H02G 3/12; H02G 3/10; H05K 5/00; H05K 5/02; H01R 13/52; H01R 13/746; H01R 13/53; H01R 13/533; H01R 13/46; F16M 11/043; F16M 11/04; Y10T 29/49826

USPC ............ 174/50, 53, 57, 58, 480, 481; 220/3.2–3.9, 4.02; 248/906
See application file for complete search history.

(56) References Cited

U.S. PATENT DOCUMENTS

| 4,634,015 A * | 1/1987 | Taylor .................. H02G 3/121 220/3.7 |
|---|---|---|
| 5,224,673 A | 7/1993 | Webb |
| 5,931,325 A | 8/1999 | Filipov |
| (Continued) | | |

*Primary Examiner* — Angel R Estrada
(74) *Attorney, Agent, or Firm* — Wissing Miller LLP

(57) ABSTRACT

A round mud ring assembly includes a base member, a raised member, a telescoping member and a plurality of drive members. The base member has a flange and a circular opening through the flange. The raised member extends from the base member and follows the circular opening in the flange to form a circular raised wall. The raised member has a plurality of mounting tabs extending from the raised wall toward a center of the circular opening. The telescoping member is positioned within the raised member and is movable within the raised member between a retracted position and an extended position. The telescoping member has a circular wall and a plurality of mounting tabs extending from the circular wall toward a center of the circular opening. The circular wall of the telescoping member includes a plurality of protective members. Each protective member is positioned in proximity to one of a mounting tab pairs. In this configuration, one of the plurality of drive members is operatively coupled to the mounting tabs of one of the mounting tab pairs, such that rotation of the drive members causes the telescoping member to move between the retracted position and the extended position.

27 Claims, 13 Drawing Sheets

(56) References Cited

U.S. PATENT DOCUMENTS

| | | | |
|---|---|---|---|
| 5,975,323 A * | 11/1999 | Turan | H02G 3/086 |
| | | | 220/919 |
| 6,209,836 B1 | 4/2001 | Swanson | |
| 6,666,419 B1 | 12/2003 | Vrame | |
| 6,820,760 B2 | 11/2004 | Wegner | |
| 7,025,314 B1 | 4/2006 | Thomas | |
| 7,038,131 B1 | 5/2006 | Gretz | |
| 7,259,328 B1 | 8/2007 | Gretz | |
| 7,301,099 B1 | 11/2007 | Korcz et al. | |
| 7,355,118 B1 | 4/2008 | Gretz | |
| 7,468,486 B2 | 12/2008 | Yan | |
| 7,531,743 B2 | 5/2009 | Johnson et al. | |
| 7,645,936 B2 | 1/2010 | Magno, Jr. | |
| 7,824,213 B1 | 11/2010 | Korcz et al. | |
| 8,076,577 B2 | 12/2011 | Mango, Jr. et al. | |
| 8,575,484 B1 | 11/2013 | Witherbee | |
| 8,680,394 B2 | 3/2014 | Korcz et al. | |
| 9,252,579 B2 * | 2/2016 | Korcz | H02G 3/08 |
| 9,553,438 B2 | 1/2017 | Korcz et al. | |
| 10,263,403 B2 | 4/2019 | Korcz et al. | |
| 11,557,888 B2 * | 1/2023 | Phillips | H01R 13/746 |
| 2002/0158845 A1 | 10/2002 | Vrame | |
| 2010/0270446 A1 | 1/2010 | Phillips | |
| 2010/0108347 A1 | 5/2010 | Korcz | |
| 2010/0218969 A1 | 9/2010 | Purves | |
| 2010/0252552 A1 | 10/2010 | Nikayin | |
| 2014/0202758 A1 | 7/2014 | Lolachi | |
| 2014/0238738 A1 | 8/2014 | Korcz | |
| 2015/0001357 A1 | 1/2015 | Jaffari | |

\* cited by examiner

ROUND ADJUSTABLE MUD RING ASSEMBLY

CROSS REFERENCE TO RELATED APPLICATIONS

The present disclosure is based on and claims benefit from U.S. Provisional Patent Application Ser. No. 63/048,511 filed on Jul. 6, 2020 entitled "Round Adjustable Mud Ring Assembly" the contents of which are incorporated herein in their entirety by reference.

BACKGROUND

Field

The present disclosure relates generally to mud rings, and more particularly to adjustable round mud ring assemblies.

Description of the Related Art

Electrical devices (e.g., electrical outlets, switches, and others) are typically installed in a wall or ceiling. A gang or junction box is typically secured to a stud or support beam inside the wall or ceiling. The electrical device is then secured in the box in electrical communication with one or more electrical conductors so that the electrical device extends or protrudes from the wall or ceiling. In this manner, any exposed portion of the electrical conductor and its connection to the electrical device is shielded within the box. Plaster rings, extension rings, and extenders, commonly known as mud rings, are typically attached to the box prior to the installation of sheet rock, wall board, or other covering surface material.

SUMMARY

The present disclosure provides exemplary embodiments of round mud ring assemblies and mud ring kits. In an exemplary embodiment, a round mud ring assembly includes a base member, a raised member, a telescoping member and a plurality of drive members. The base member has a flange and a circular opening through the flange. The raised member extends from the base member and follows the circular opening in the flange to form a circular raised wall. The raised member has a plurality of mounting tabs extending from the raised wall toward a center of the circular opening. The plurality of mounting tabs are substantially perpendicular to the raised wall. The telescoping member is positioned within the raised member and is movable within the raised member between a retracted position and an extended position. The telescoping member has a circular wall and a plurality of mounting tabs extending from the circular wall toward a center of the circular opening so that the plurality of mounting tabs are substantially perpendicular to the circular wall. In this configuration, one of the plurality of mounting tabs on the telescoping member is aligned with one of the mounting tabs on the raised member to define a mounting tab pair. The circular wall of the telescoping member may include a plurality of protective members. In this configuration, one protective member is positioned in proximity to one of the mounting tab pairs. In this configuration, one of the plurality of drive members is operatively coupled to the mounting tabs of one of the mounting tab pairs such that rotation of the drive members cause the telescoping member to move between the retracted position and the extended position.

In another exemplary embodiment, a round mud ring assembly includes a base member, a raised member, a telescoping member and a plurality of drive members. The base member has a flange and a circular opening through the flange. The raised member extends from the base member and follows the circular opening in the flange to form a circular raised wall. The raised member has a plurality of mounting tabs extending from the raised wall toward a center of the circular opening. The telescoping member is positioned within the raised member and movable within the raised member between a retracted position and an extended position. The telescoping member has a circular wall and a plurality of mounting tabs extending from the circular wall toward a center of the circular opening. In this configuration, one of the plurality of mounting tabs of the telescoping member is aligned with one of the mounting tabs of the raised member to define a mounting tab pair. In addition, the circular wall may include a plurality of protective members wherein one of the plurality of protective members is positioned in proximity to one of the mounting tab pairs. The plurality of drive members, wherein one of the plurality of drive members is operatively coupled to the mounting tabs of one of the mounting tab pairs such that rotation of the drive member causes the telescoping member to move between the retracted position and the extended position.

In an exemplary embodiment, a round mud ring kit includes an electrical box and a mud ring assembly. The mud ring assembly includes a base member, a raised member, a telescoping member and a plurality of drive members as described herein.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
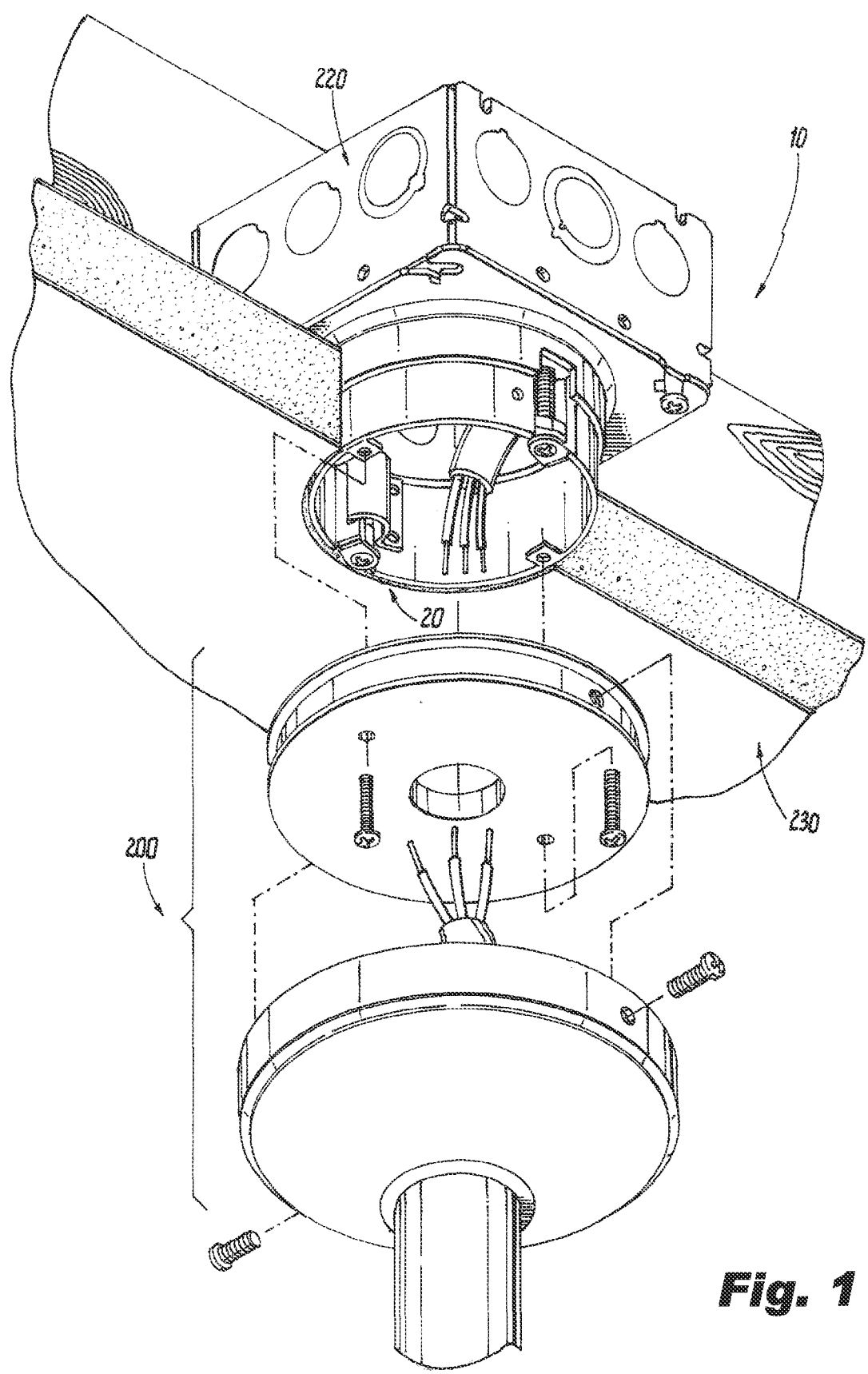
FIG. 1 is an exploded perspective view of an exemplary embodiment of an electrical box mounted to a beam and an adjustable mud ring secured to the electrical box and extending through a wall covering.

The present disclosure provides exemplary embodiments of adjustable mud ring assemblies for electrical boxes and kits that include an adjustable mud ring assembly according to the present disclosure and an electrical box to which the adjustable mud ring assembly can be secured. As shown in FIG. 1, the adjustable mud ring assemblies 20 according to the present disclosure are round adjustable mud ring assemblies that can be used when securing an electrical device, such as an electrical switch, an electrical receptacle, or an electrical fixture 200 with a round profile to an electrical box 220. The round adjustable mud ring assemblies 20 are typically attached to an electrical box 220 prior to the installation of a surface covering material 230, such as drywall, sheetrock, wall board, cement backer board, fiber cement backer board, or other surface covering materials. The electrical box 220 and adjustable mud ring assembly 20 can be installed in different orientations to conform to a desired or required orientation of the electrical device or fixture to be attached to the adjustable mud ring assembly.

The electrical devices or fixtures 200 contemplated by the present disclosure include, for example, electrical switch devices, electrical receptacle devices, electrical lighting fixtures and electrical ceiling fan fixtures. For ease of description, the electrical devices or fixtures may also be referred to herein collectively as the "fixtures" in the plural, and the "fixture" in the singular. The electrical box 220 may be made of metal or plastic. Non-limiting examples of metal electrical boxes include steel, aluminum, and aluminum alloy boxes. Non-limiting examples of plastic electrical boxes include PVC boxes and other molded plastic boxes. The electrical boxes may be single gang, multi-gang, round or octagon boxes, and for ease of description may be referred to herein as the "boxes" in the plural and the "box" in the singular. The adjustable mud ring assemblies 20 according to the present may be made of metal or plastic. Non-limiting examples of metal adjustable mud ring assemblies include steel, aluminum, and aluminum alloy adjustable mud ring assemblies. Non-limiting examples of plastic adjustable mud ring assemblies include PVC adjustable mud ring assemblies and other molded plastic adjustable mud ring assemblies. For ease of description, the adjustable mud ring assemblies may also be referred to herein as the "mud rings" in the plural and the "mud ring" in the singular.

Figure 2:
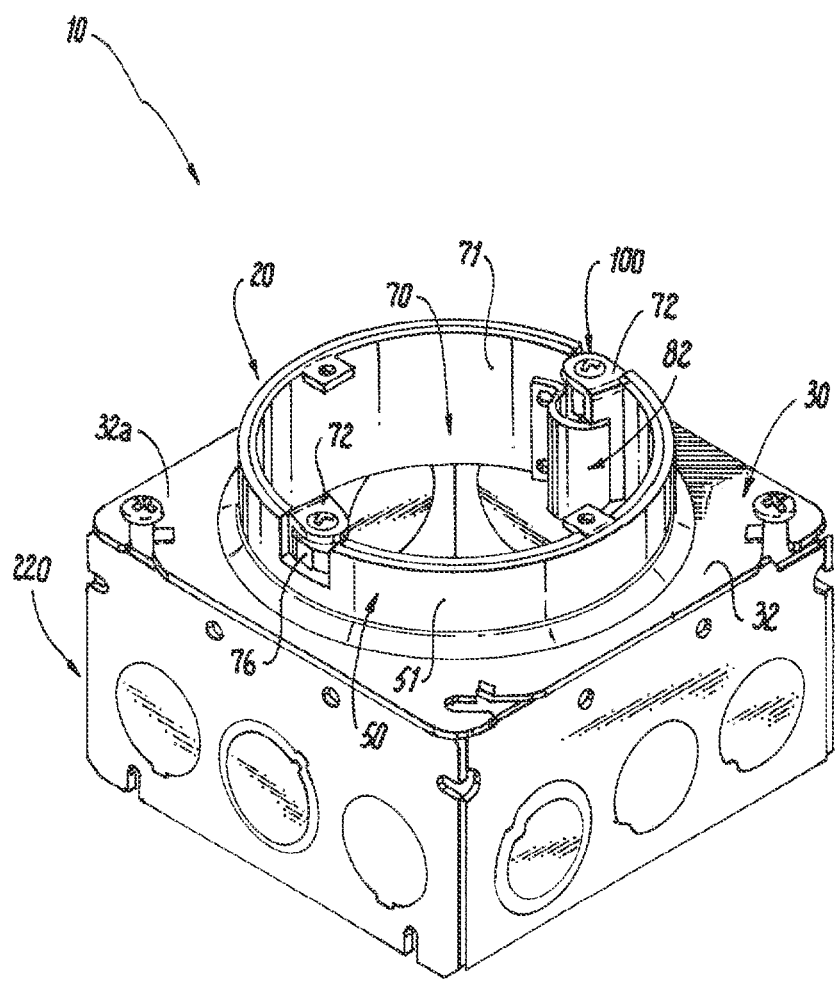
FIG. 2 is a perspective view of the electrical box and adjustable mud ring of FIG. 1, illustrating the mud ring in a retracted position.

Referring now to FIG. 2, an exemplary embodiment of a mud ring kit 10 is shown. The mud ring kit 10 includes a mud ring 20 and an electrical box 220. Referring to FIGS. 3-9, the mud ring 20 according to the present disclosure includes a base member 30, a raised member 50, a movable or telescoping member 70, and one or more drive members 100.

Figure 3:
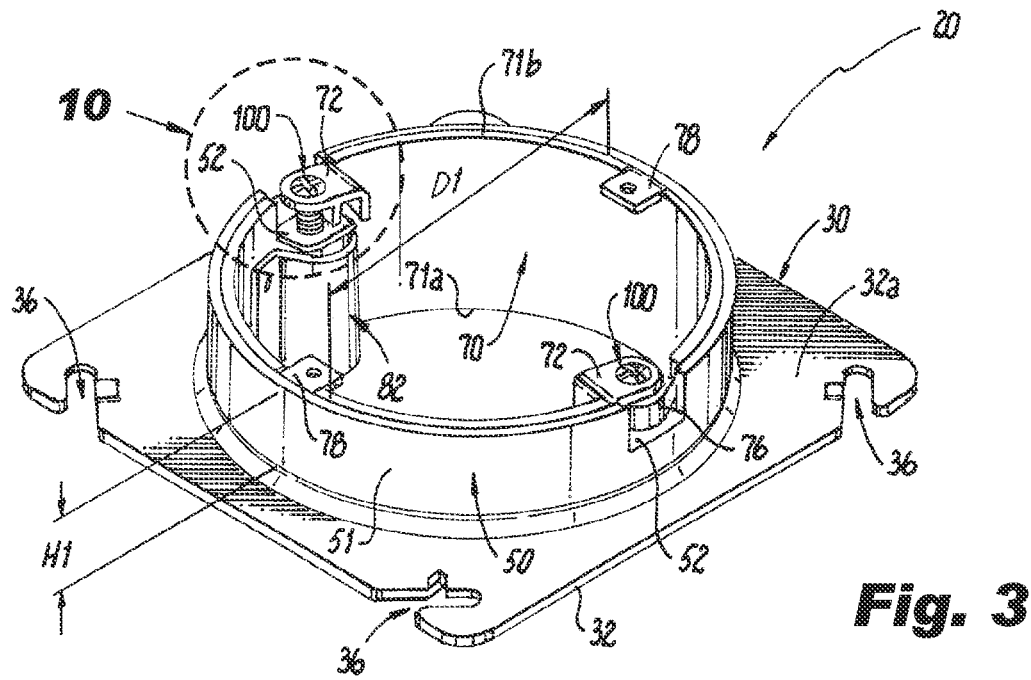
FIG. 3 is a top perspective view of the mud ring of FIG. 2 in the retracted position.

Referring to FIGS. 3-15, the base member 30 includes a substantially planar flange 32 and an opening 34, seen in FIGS. 2 and 3. The flange 32 includes one or more mounting openings 36, e.g., keyhole slots, used for securing the base member 30 to a box 220. The raised member 50 of the mud ring 20 extends from a top surface 32a of the flange 32 to provide a circular ring or wall 51 having a height "H1" and an inside diameter "D1." The height "H1" of the wall 51 is preferably set to coincide with a minimum thickness of a surface covering material 230, see in if FIG. 1, through which a portion of the mud ring 20 may extend. For example, if the thickness of the surface covering material 230 is to be ½ inch, the height "H1" of the wall 51 of the raised member 50 would be between about ¼ of an inch and about ½ inch. The inside diameter "D1" of the wall 51 is preferably set to be slightly greater than a diameter of a round box for mounting fixtures 200, seen in FIG. 1, to the mud ring 20. For example, if the diameter of a 3½" inch round box is in the range of about 3 inches to about 4 inches, the inside diameter "D1" would be in the range of about 3 inches to about 4 inches. The raised member 50 extends substantially along the perimeter of the opening 34 in the base member 30 extending the opening 34 to the inside diameter of the raised member 50. The raised member 50 may be integral with or monolithically formed into the base member 30. In another embodiment, the raised member 50 may be secured to the base member 30 using, for example, welds or mechanical fasteners. The raised member 50 includes one or more mounting tabs 52 that extend from the wall 51 of the raised member 50 into the opening 34 so that the mounting tabs 52 are substantially perpendicular to the wall 51. Each mounting tab 52 includes an aperture 54, seen in FIG. 6, configured and dimensioned to operatively interact with one of the one or more drive members 100 such that activation of the drive member 100 can move the telescoping member 70 between a retracted position, seen in FIGS. 7 and 8, and a fully extended position, seen in FIGS. 14 and 16.

Figure 4:
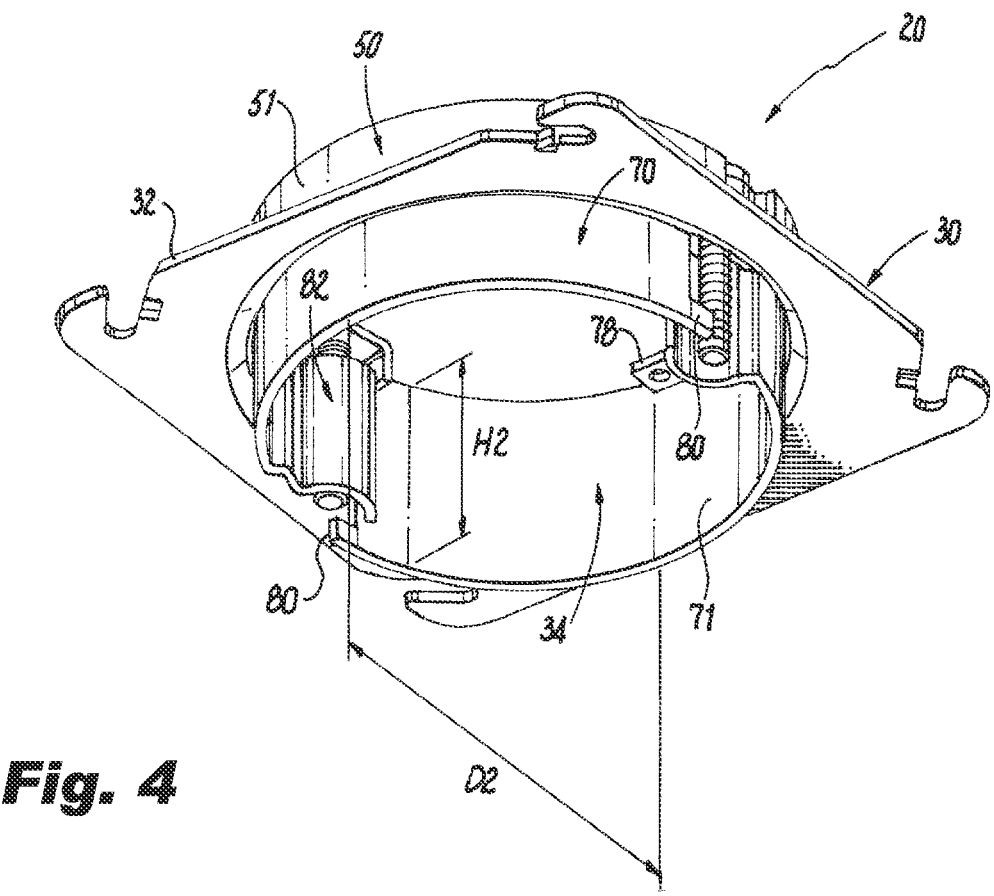
FIG. 4 is a bottom perspective view of the mud ring of FIG. 2 in the retracted position.

The telescoping member 70 provides a circular ring or wall 71 having a height "H2" and an outside diameter "D2" as seen in FIG. 4. The height "H2" is preferably set to provide a desired maximum extension of the mud ring 20. For example, if the desired maximum extension of the mud ring 20 is to be about 1-2 inches, the height "H2" of the telescoping member 70 would be in the range of about 1 inch to about 2 inches. The outside diameter "D2" of the telescoping member 70 is less than the inside diameter "D1" of the raised member 50 so that the telescoping member 70 fits within the raised member 50 and is movable relative to the base member 30 and the raised member 50 extending the opening 34 to the inside diameter of the telescoping member 70. Preferably, the outside diameter "D2" is set to coincide with the diameter of a round electrical box used for mounting fixtures 200, seen in FIG. 1, to the mud ring 20. For example, if the diameter of a 3½" inch round box is in a range of about 3 inches to about 4 inches, the outside diameter "D2" would be in a range of about 3 inches to about 4 inches. The telescoping member 70 includes one or more mounting tabs 72 that extend toward a center of the opening 34 so that the mounting tabs 72 are substantially perpendicular to the wall 71 of the telescoping member 70. Each mounting tab 72 includes an aperture 74, seen in FIGS. 9, 11 and 12, configured and dimensioned to receive one of the one or more drive members 100 so that the drive member 100 can pass through mounting tab 72 but remain rotatably coupled within the mounting tab aperture 74.

Figure 5:
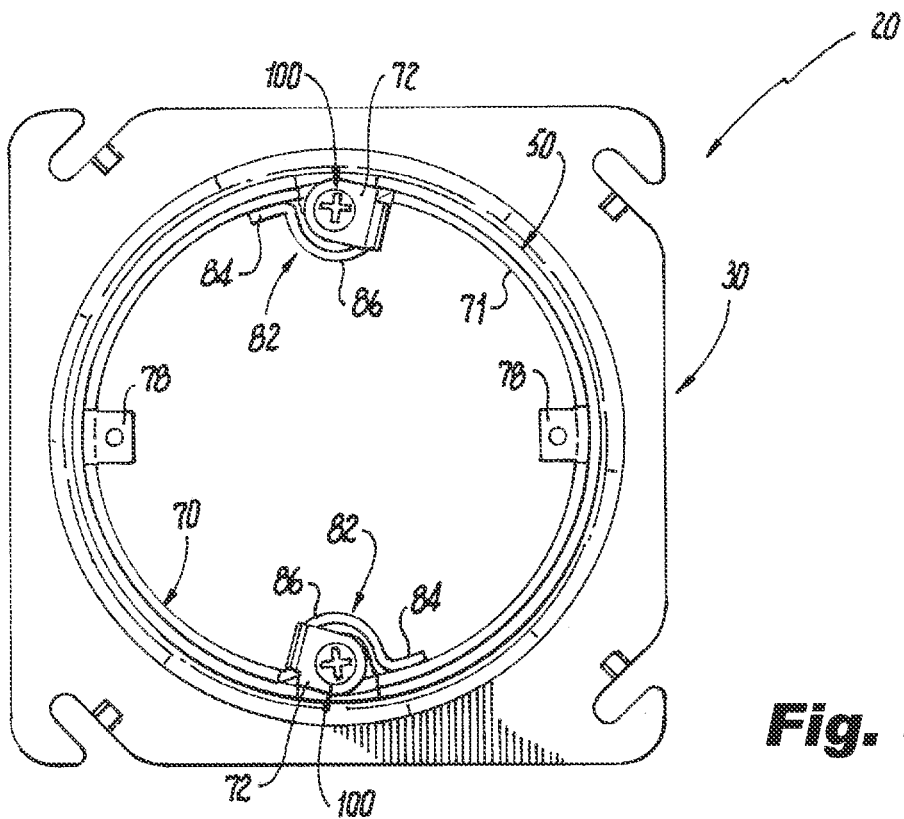
FIG. 5 is a top plan view of the mud ring of FIG. 2.
Figure 6:
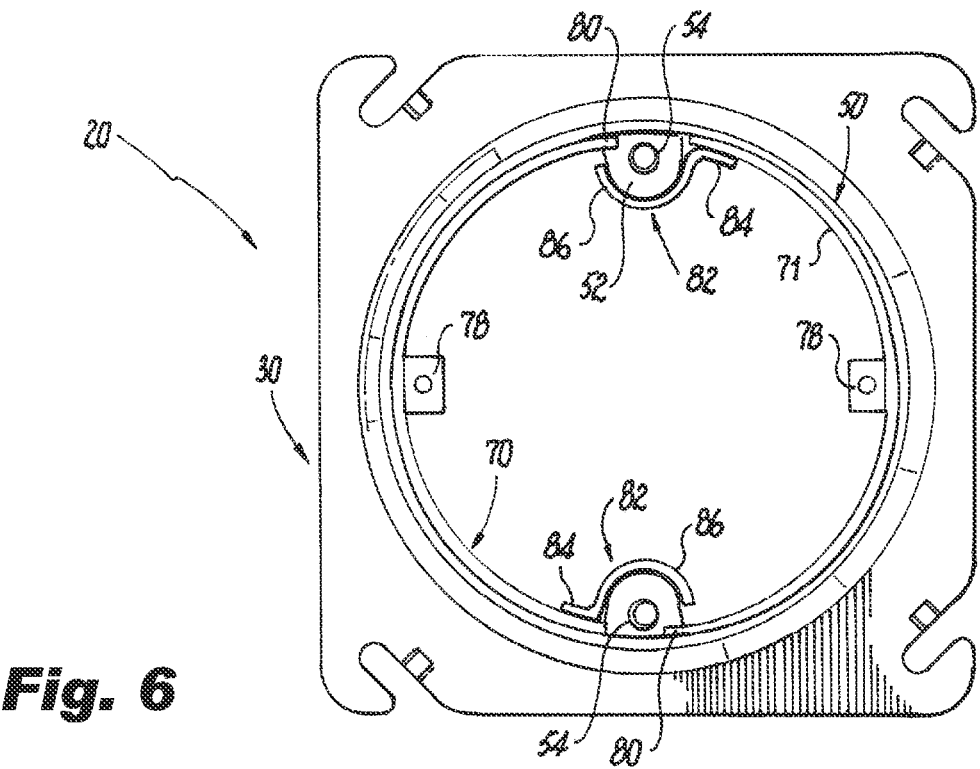
FIG. 6 is a bottom plan view of the mud ring of FIG. 2.

In the embodiment shown, there are two mounting tabs 52 on the raised member 50 and two mounting tabs 72 on the telescoping member 70, seen in FIGS. 5 and 6. The mounting tabs 52 are positioned on opposite sides of the wall 51 of the raised member 50 about 180 degrees apart. Similarly, mounting tabs 72 are positioned on opposite sides of the wall 71 of the telescoping member 70 about 180 degrees apart. As shown, a first mounting tab 52 of the raised member 50 is aligned with a first mounting tab 72 of the telescoping member 70 to form a first mounting tab pair. In this configuration, the opening 54 in the first mounting tab 52 is aligned with the opening 74 in the first mounting tab 72 so that a first drive member 100 can pass through the opening 74 into operative engagement with the opening 54. Similarly, a second mounting tab 52 of the raised member 50 is aligned with a second mounting tab 72 of the telescoping member 70 to form a second mounting tab pair. In this configuration, the opening 54 in the second mounting tab 52 is aligned with the opening 74 in the second mounting tab 72 so that a second drive member 100 can pass through the opening 74 in the second mounting tab 72 into operative engagement with the opening 54 in the second mounting tab 52.

Figure 7:
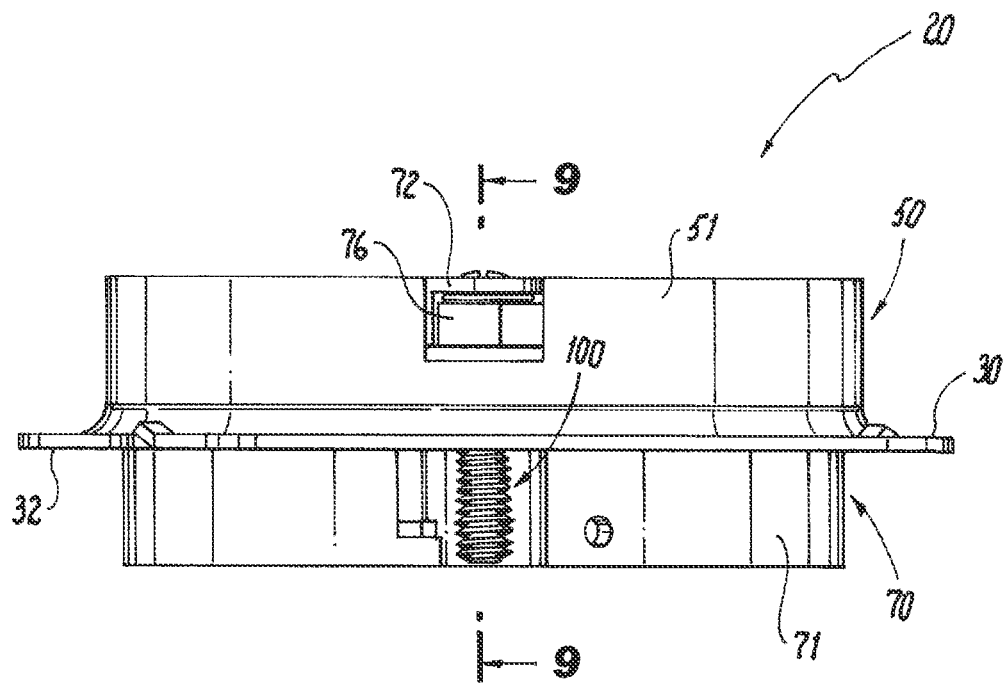
FIG. 7 is a first side elevation view of the mud ring of FIG. 2 in the retracted position.
Figure 8:
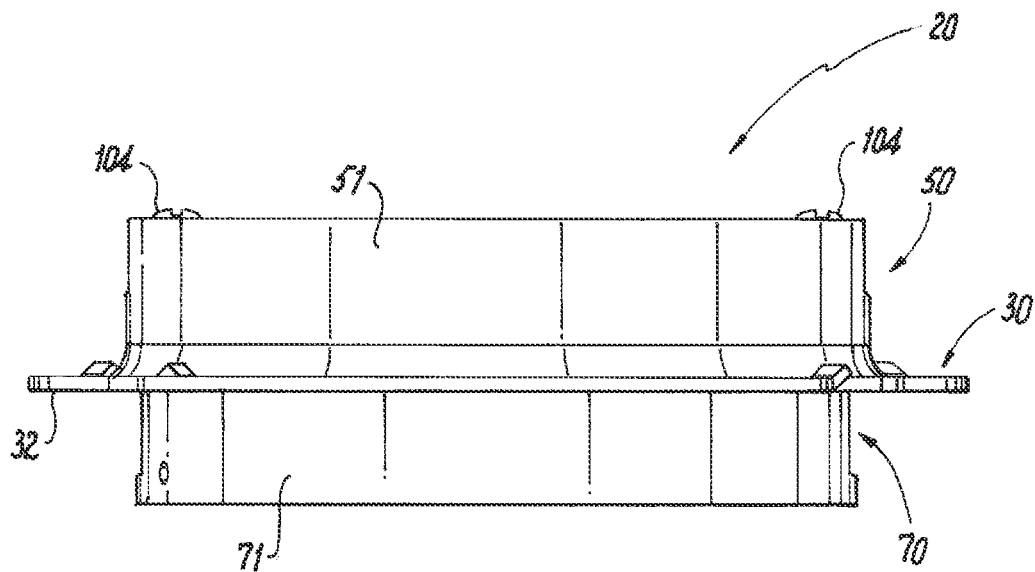
FIG. 8 is a second side elevation view of the mud ring of FIG. 2 in the retracted position.
Figure 9:
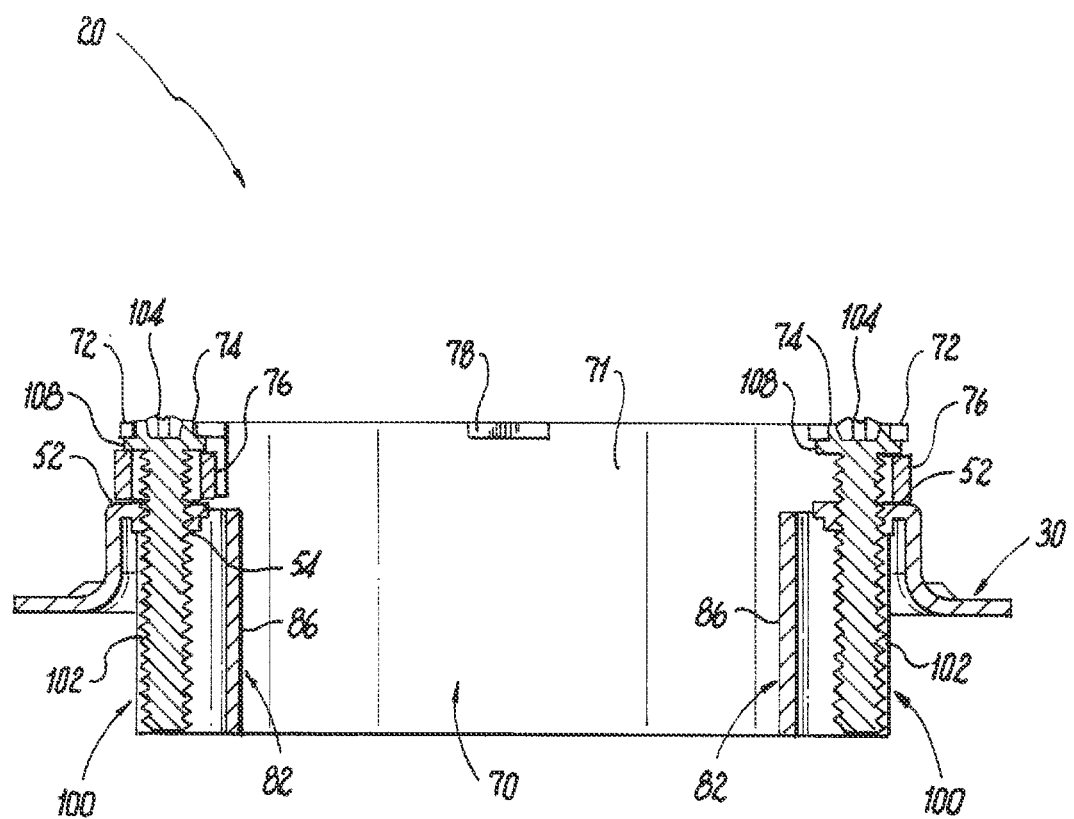
FIG. 9 is a cross-sectional view of the mud ring of FIG. 7 taken from line 9-9.
Figure 10:
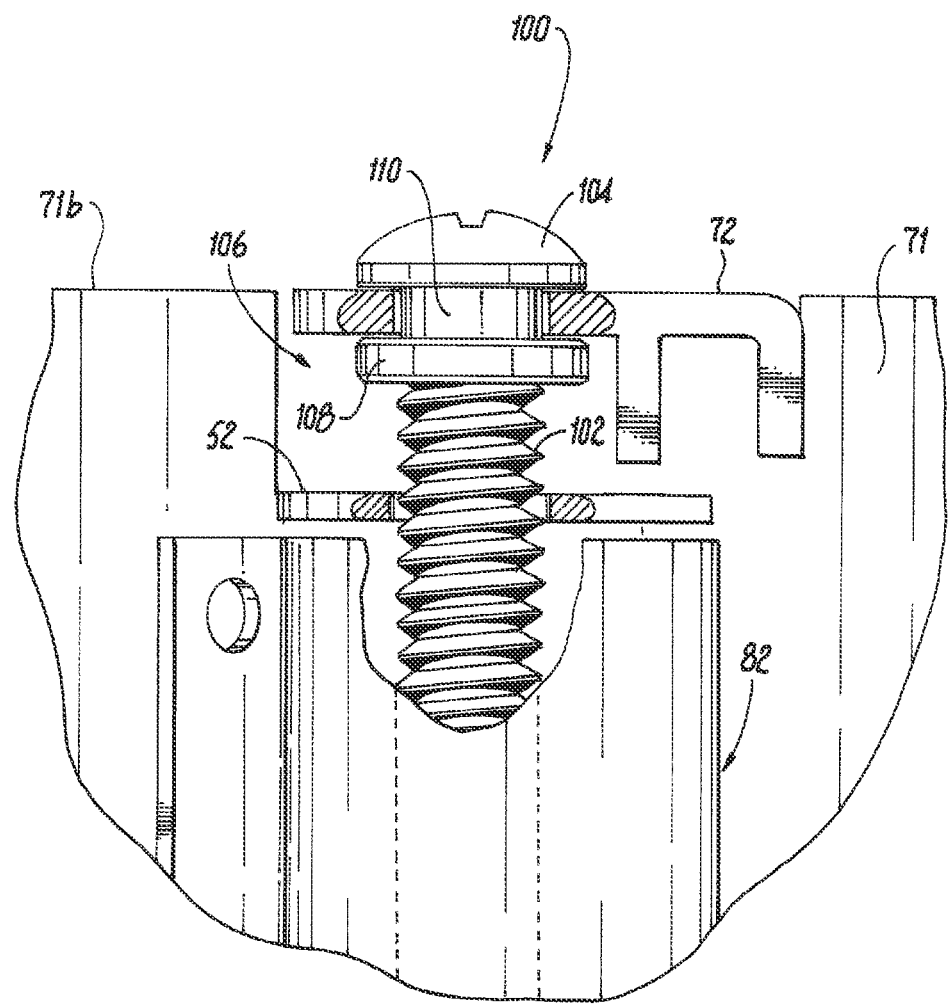
FIG. 10 is a side elevation view of an exemplary embodiment of a drive member according to the present disclosure.
Figure 11:
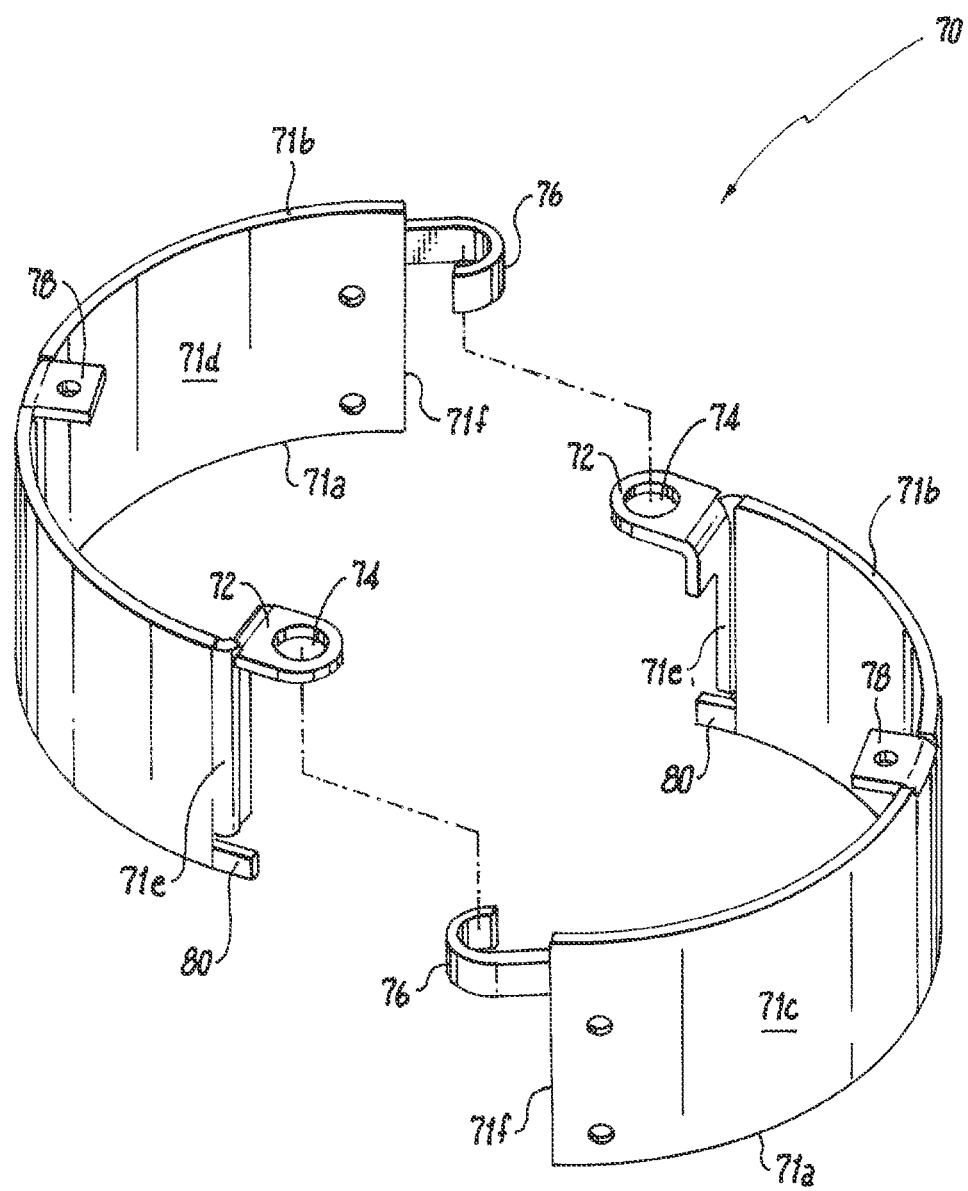
FIG. 11 is an exploded perspective view of an exemplary embodiment of a two-piece telescoping member of the mud ring of FIG. 2.
Figure 14:
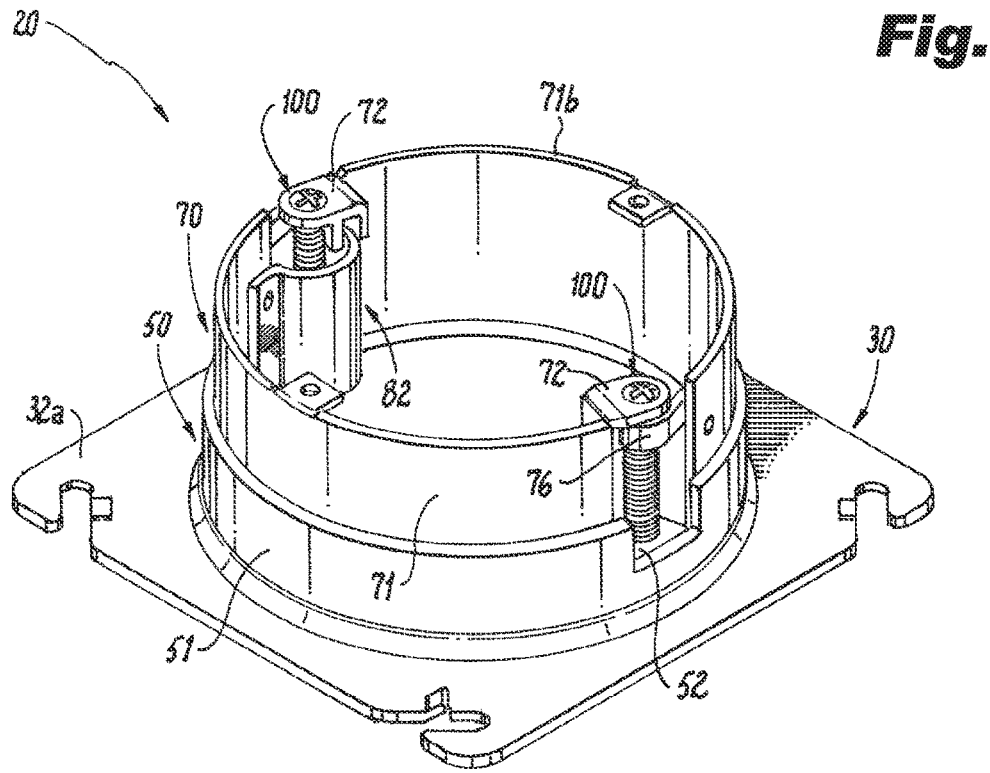
FIG. 14 is a top perspective view of the mud ring of FIG. 13 in the fully extended position.
Figure 15:
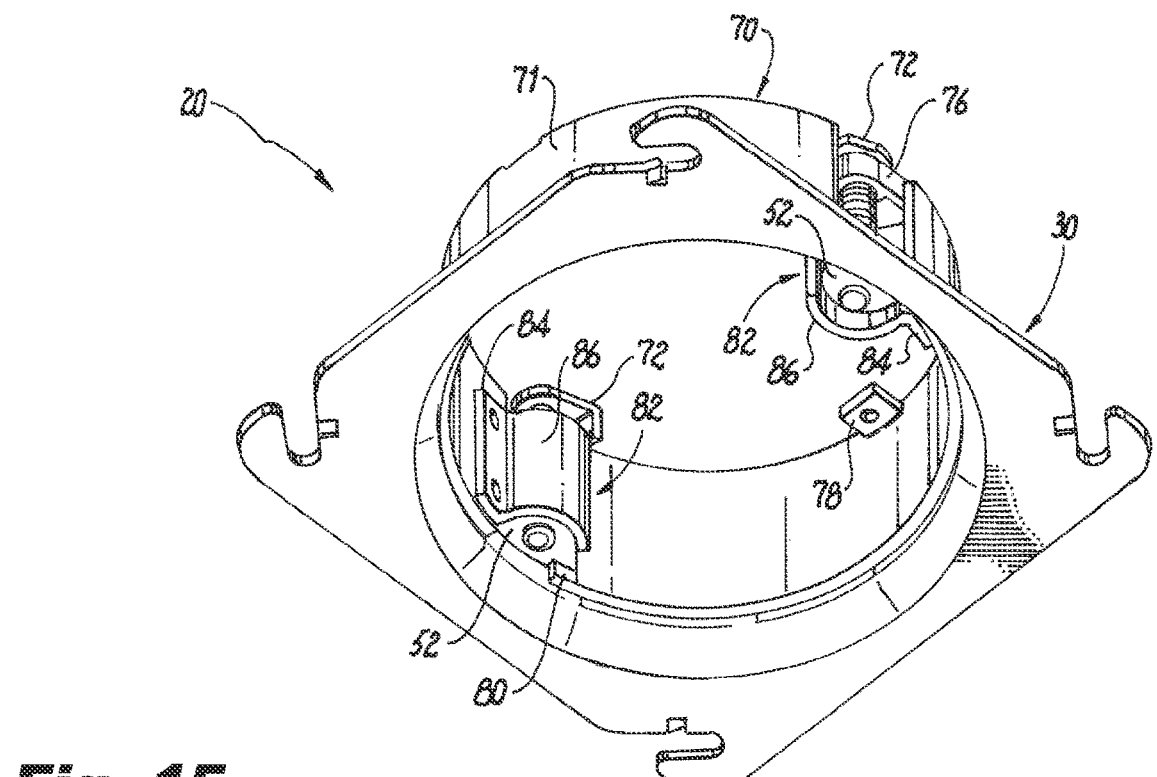
FIG. 15 is a bottom perspective view of the mud ring of FIG. 13 in the fully extended position.
Figure 16:
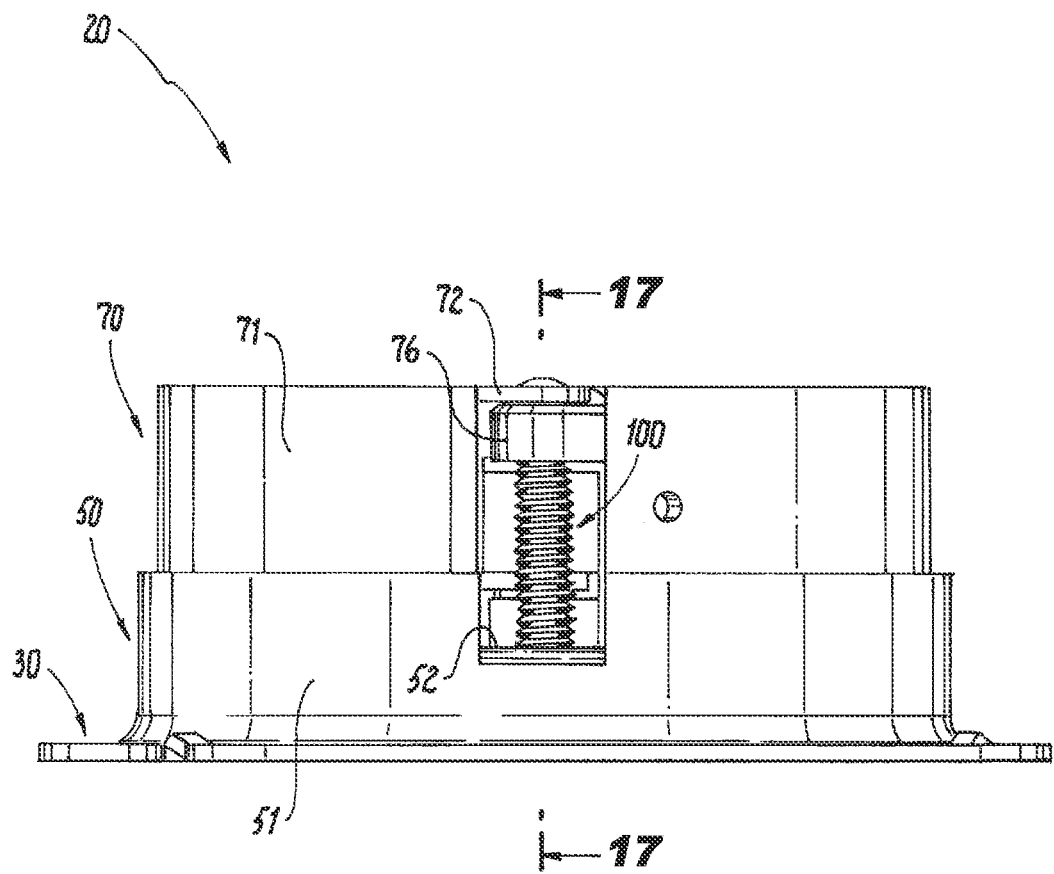
FIG. 16 is a side elevation view of the mud ring of FIG. 13 taken from the second side and illustrating the mud ring in the fully extended position.
Figure 17:
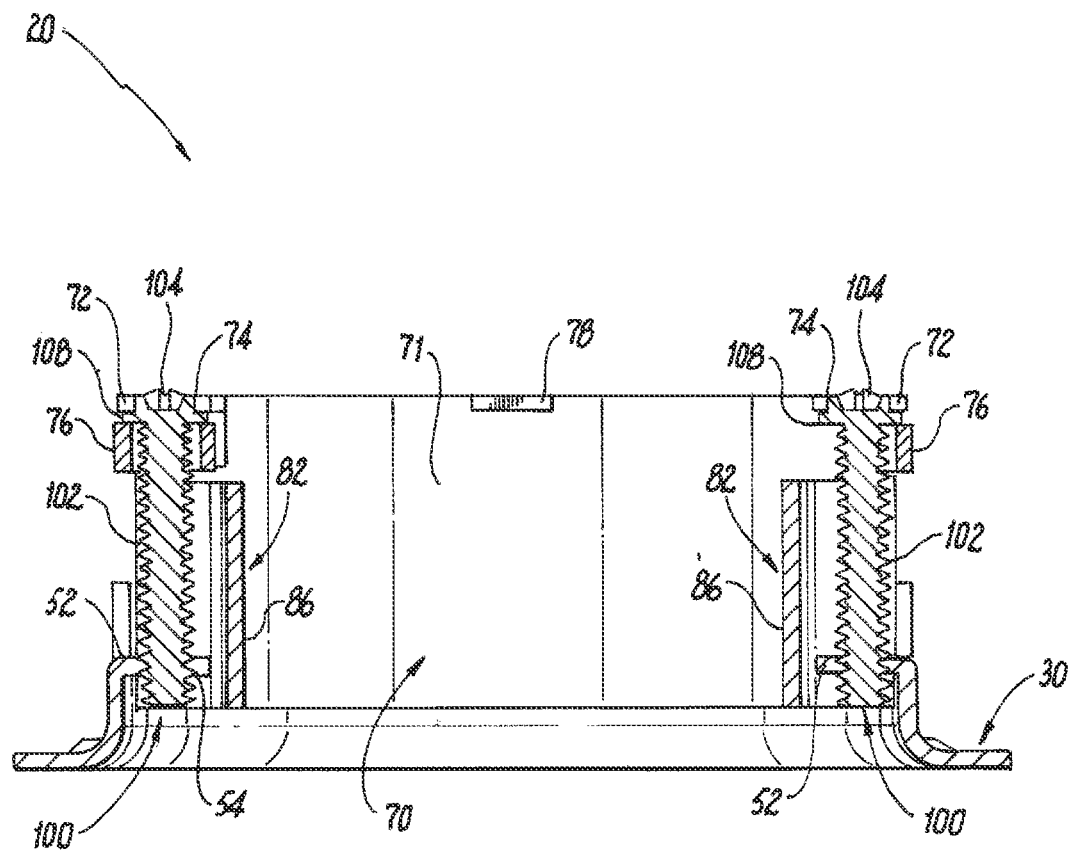
FIG. 17 is a cross-sectional view of the mud ring of FIG. 16 taken from line 17-17.

Referring to FIGS. 7, 9 and 15, the telescoping member 70 also includes a first stop arm 76 provided to stop movement of the telescoping member 70 when the telescoping member reaches the retracted position, seen in FIGS. 7 and 9. The stop arm 76 is positioned adjacent the mounting tab 72 so that the stop arm 76 is positioned between the mounting tab 72 of the telescoping member 70 and the mounting tab 52 of the raised member 50. With the stop arm 76 positioned between the mounting tab 72 of the telescoping member 70 and the mounting tab 52 of the raised member 50, as the telescoping member 70 is being moved to the retracted position by the drive member 100, the mounting tab 72 and stop arm 76 move toward the mounting tab 52 of the raised member 50. When the stop arm 76 contacts the mounting tab 52 of the raised member 50, the telescoping member 70 is in the retracted position. The telescoping member 70 also includes a second stop arm 80, seen in FIG. 11, provided to stop movement of the telescoping member 70 when the telescoping member reaches the fully extended position, as shown in FIG. 15. The second stop arm 80 extends from a bottom edge 71a of the wall 71 so that the stop arm 80 is positioned to engage the mounting tab 52 of the raised member 50. With the stop arm 80 positioned to engage or contact the mounting tab 52 of the raised member 50, as the telescoping member 70 is being moved to the fully extended position by the drive member 100, the stop arm 80 moves toward the mounting tab 52 of the raised member 50. When the stop arm 80 contacts the mounting tab 52, the telescoping member 70 is in the fully extended position, seen in FIGS. 13-17.

As shown in FIGS. 14 and 15, the telescoping member 70 includes one or more protective members 82 that are provided to prevent electrical wires withing an electrical box 220 from contacting the drive members 100. As noted above, in the embodiment shown there are two sets of mounting tabs 52 and 72, where the openings 54 and 74 of a first set of mounting tabs 52 and 72 are aligned, and the openings 54 and 74 of a second set of mounting tabs 52 and 72 are aligned. A first drive member 100 extends through the openings 54 and 74 of the first set of mounting tabs 52 and 72 and is operatively coupled to the first set of mounting tabs 52 and 72. Similarly, a second drive member 100 extends through the openings 54 and 74 of the second set of mounting tabs 52 and 72 and is operatively coupled to the second set of mounting tabs 52 and 72. In this configuration, there are also two protective members 82. The first protective member 82 is associated with the first set of mounting tabs 52 and 72, and the second protective member 82 is associated with the second set of mounting tabs 52 and 72. Each protective member 82 includes a base 84 and a shroud 86. In one embodiment, the base 84 is integral with or monolithically formed into the wall 71 of the telescoping member 70. In another embodiment, the base 84 of the of the protective member 82 may be secured to the wall 71 by welds, adhesives or mechanical fasteners. The base 84 can extend from a bottom edge 71a of the wall 71 to a top edge 71b of the wall 71, or the base 84 can extend from the bottom edge 71a of the wall 71 to a point between the bottom edge 71a and the top edge 71b of the wall 71. In the exemplary embodiment shown, the base 84 extends from the bottom edge 71a for a distance of about 1-2 inches.

Referring again to FIGS. 13 and 17, the telescoping member 70 also includes one or more device mounting tabs 78 used to secure a fixture 200 or an electrical device to the mud ring 20. In the embodiment shown, the telescoping member 70 includes two device mounting tabs 78 that extend from a top edge 71b of the wall 71 into the opening 34. As noted above, the opening 34 is the combination of the opening in the base member 30, the opening in the raised member 50 and the opening in the telescoping member 70. The device mounting tabs 78 extend or protrude from the wall 71 so that they are substantially perpendicular to the wall 71. The device mounting tabs 78 are positioned on opposite sides of the wall 71 of the telescoping member 70 about 180 degrees apart. In the embodiment shown, the device mounting tabs 78 are positioned on opposite sides of the wall 71 of the telescoping member 70 about ninety degrees from the mounting tabs 72.

Figure 12:
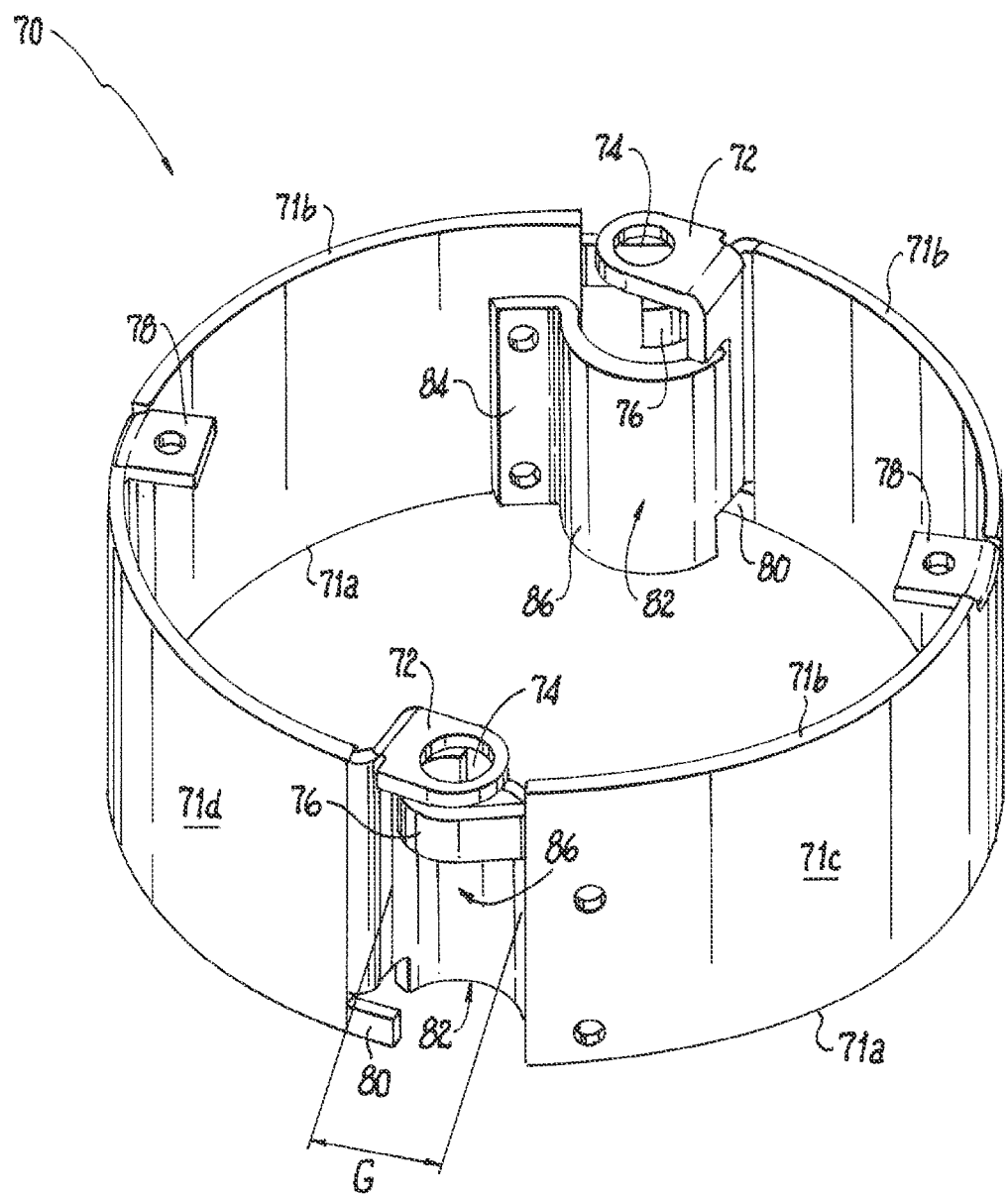
FIG. 12 is a perspective view of the two-piece telescoping member of FIG. 11, illustrating two wall segments aligned to be interlinked.
Figure 13:
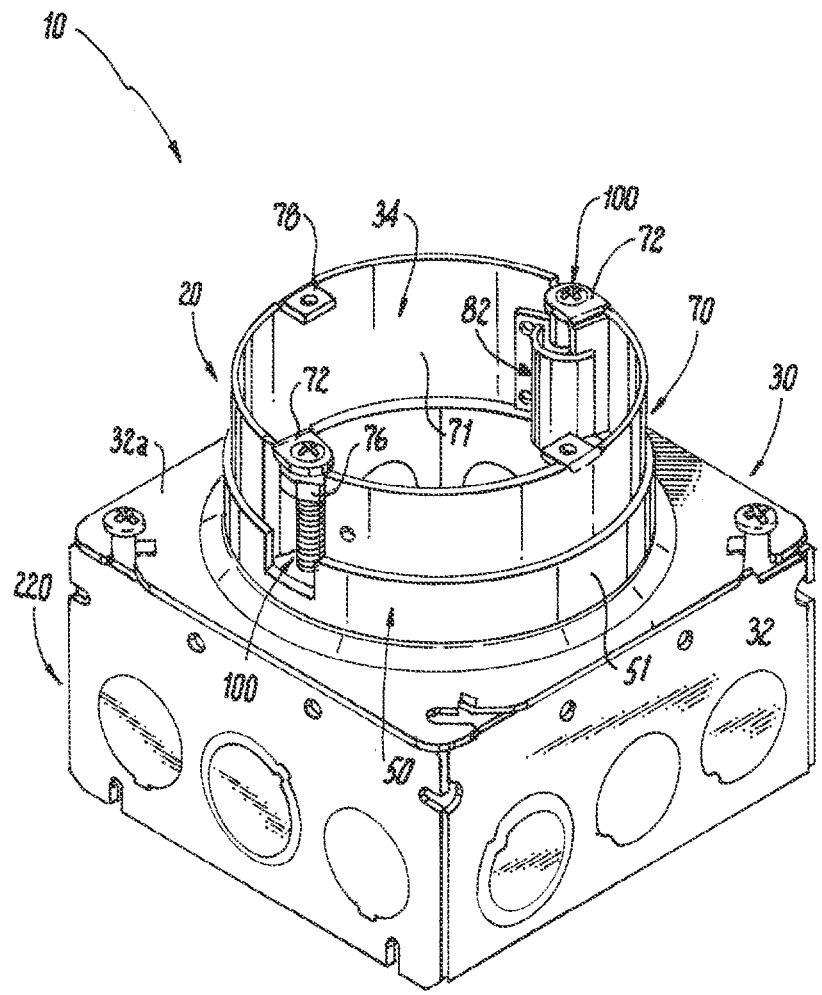
FIG. 13 is a perspective view of the electrical box and adjustable mud ring of FIG. 1, illustrating the mud ring in a fully extended position.

The telescoping member 70 may be a single monolithic structure or the telescoping member 70 may be made of two or more interlinked members. For example, in FIGS. 11 and 12, the telescoping member 70 includes two arcuate wall segments 71c and 71d that are interlinked to form the circular ring or wall 71 of the telescoping member 70 having the height "H2" and the outside diameter "D2" described above. A first end 71e of each arcuate wall segment 71c or 71d includes a mounting tab 72 and a stop arm 80. The mounting tab 72 is positioned at or near the top edge 71b of the wall segment 71c or 71d. The stop arm 80 is positioned at or near the bottom edge 71a of the wall segment 71c or 71d. The mounting tab 72 has an aperture 74 configured and dimensioned to receive one of the drive members 100. As described above, the drive member 100 passes through mounting tab 72 but remains rotatably coupled to the mounting tab 72. A second end 71f of each wall segment 71c or 71d includes the stop arm 76. The stop arm 76 is positioned at or near the top edge 71b of the wall segment 71c or 71d. The stop arm 76 in this exemplary embodiment is a hooked shaped or U-shaped member extending from the second end 71f. Each wall segment 71c or 71d also includes a device mounting tab 78 that extends away from the top edge 71b of the wall segment inwardly toward a center of the circular ring or wall 71. The device mounting tab 78 is separated from each end 71e and 71f of the wall segment 71c or 71d by about 90 degrees. Each wall segment 71c or 71d also includes a protective member 82 that is provided to shroud the drive member 100 and prevent electrical wires withing an electrical box 220 from contacting the drive member 100. To interlink the wall segments 71c and 71d to form the circular ring or wall 71 of the telescoping member 70, the stop arm 76 of each wall segment is positioned so that the hook portion of the stop arm 76 is beneath the mounting tab 72 of the opposite wall segment, as shown in FIG. 12. As shown, when the stop arm 76 is beneath the mounting tab 72 of the opposite wall segment, the shroud 86 of the protective member 82 is positioned to cover the gap "G" between the two wall segments 71c and 71d. When a drive member 100 is operatively coupled to the mounting tab 72 and the mounting tab 52, the shroud 86 prevents wires within an electrical box 220 from contacting the drive member 100 and the wall segments 71c and 71d are interlinked.

Referring again to FIGS. 9 and 10, each of the one more drive members 100 is operatively coupled to a mounting tab 52 of the raised member 50 and to a mounting tab 72 of the telescoping member 70 and are positioned within the opening 34 of the mud ring 20. In the exemplary embodiment shown, the mud ring 20 includes two drive members 100. Each drive member 100 is a fastener including a threaded shank 102, a head 104, and a bearing portion 106 positioned between the threaded shank 102 and the head 104. The bearing portion 106 includes a flange 108 positioned adjacent an end of the threaded shank 102 and a smooth cylindrical surface 110 formed between the flange 108 and the head 104. The smooth cylindrical surface 110 is positioned in the opening 74 in the mounting tab 72 of the telescoping member 70. The head 104 and the flange 108 prevent the fastener 100 from being removed from the mounting tab 72 of the telescoping member 70 while permitting the fastener 100 to freely rotate relative to the mounting tab 72.

During installation, an operator can rotate the drive members 100 to thread or unthread the threaded shanks 102 relative to the mounting tabs 52, thus changing the position of the telescoping member 70 relative to the base member 30 and raised member 50. In this manner, the operator may adjust the depth of the telescoping member 70 between the retracted position and the extended position as necessary to accommodate various wall thicknesses.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A mud ring assembly for supporting an electrical device, the mud ring assembly comprising:
   a base member having a flange and a circular opening through the flange;
   a raised member extending from the base member, the raised member following the circular opening in the flange to form a circular raised wall, the raised member having a plurality of mounting tabs extending from the raised wall toward a center of the circular opening;
   a telescoping member positioned within the raised member and movable within the raised member between a retracted position and an extended position, the telescoping member having a circular wall and a plurality of mounting tabs extending from the circular wall toward a center of the circular opening, wherein one of the plurality of mounting tabs of the telescoping member is aligned with one of the mounting tabs of the raised member to define a mounting tab pair; and
   a plurality of drive members, wherein one of the plurality of drive members is rotatably affixed to one of the plurality of mounting tabs of the telescoping member and longitudinally movable within one of the plurality of mounting tabs of the raised member such that rotation of the drive member causes the telescoping member to move between the retracted position and the extended position.

2. The mud ring assembly according to claim 1, wherein each of the plurality of mounting tabs extending from the raised wall is substantially perpendicular to the raised wall.

3. The mud ring assembly according to claim 1, wherein the raised member is monolithically formed into the base member or secured to the base member.

4. The mud ring assembly according to claim 1, wherein each mounting tab extending from the raised wall includes an aperture to receive at least a portion of one of the plurality of drive members.

5. The mud ring assembly according to claim 1, wherein the telescoping member comprises a single monolithic structure or at least two interlinked members.

6. The mud ring assembly according to claim 1, wherein each of the plurality of mounting tabs extending from the circular wall is substantially perpendicular to the circular wall.

7. The mud ring assembly according to claim 1, wherein each mounting tab extending from the circular wall includes an aperture to receive at least a portion of one of the plurality of drive members.

8. The mud ring assembly according to claim 1, wherein each of the plurality of drive members comprises a fastener.

9. The mud ring assembly according to claim 1, wherein the circular wall includes a plurality of protective members, and wherein one of the plurality of protective members is positioned in proximity to one of the mounting tab pairs.

10. The mud ring assembly as recited in claim 1, wherein the plurality of mounting tabs of the raised member extend from above a lower edge of the raised wall and the plurality of mounting tabs of the telescoping member extend from an upper portion of the circular wall.

11. A mud ring assembly for supporting an electrical device, the mud ring assembly comprising:
    a base member having a flange and a circular opening through the flange;
    a raised member extending from the base member, the raised member following the circular opening in the flange to form a circular raised wall, the raised member having a plurality of mounting tabs extending from the raised wall toward a center of the circular opening, the plurality of mounting tabs being substantially perpendicular to the raised wall;
    a telescoping member positioned within the raised member and movable within the raised member between a retracted position and an extended position, the telescoping member having a circular wall and a plurality of mounting tabs extending from the circular wall toward a center of the circular opening and substantially perpendicular to the circular wall, wherein one of the plurality of mounting tabs of the telescoping member is aligned with one of the mounting tabs on the raised member to define a mounting tab pair, the telescoping wall including a plurality of protective members wherein one of the plurality of protective members is positioned in proximity to one of the mounting tab pairs; and
    a plurality of drive members, wherein one of the plurality of drive members is rotatably affixed to one of the plurality of mounting tabs of the telescoping member and longitudinally movable within one of the plurality of mounting tabs of the raised member such that rotation of the drive member causes the telescoping member to move between the retracted position and the extended position.

12. The mud ring assembly according to claim 11, wherein the raised member is monolithically formed into the base member or secured to the base member.

13. The mud ring assembly according to claim 11, wherein each mounting tab extending from the raised wall includes an aperture to receive at least a portion of one of the plurality of drive members.

14. The mud ring assembly according to claim 11, wherein the telescoping member comprises a single monolithic structure or at least two interlinked members.

15. The mud ring assembly according to claim 11, wherein each mounting tab extending from the circular wall includes an aperture to receive at least a portion of one of the plurality of drive members.

16. The mud ring assembly according to claim 11, wherein each of the plurality of drive members comprises a fastener.

17. The mud ring assembly as recited in claim 11, wherein the plurality of mounting tabs of the raised member extend from above a lower edge of the raised wall and the plurality of mounting tabs of the telescoping member extend from an upper portion of the circular wall.

18. A mud ring kit comprising:
an electrical box; and
a mud ring assembly, the mud ring assembly including:
  a base member having a flange and a circular opening through the flange;
  a raised member extending from the base member, the raised member following the circular opening in the flange to form a circular raised wall, the raised member having a plurality of mounting tabs extending the raised wall toward a center of the circular opening;
  a telescoping member positioned within the raised member and movable within the raised member between a retracted position and an extended position, the telescoping member having a circular wall and a plurality of mounting tabs extending from the circular wall toward a center of the circular opening, wherein one of the plurality of mounting tabs of the telescoping member is aligned with one of the mounting tabs of the raised member to define a mounting tab pair; and
  a plurality of drive members, wherein one of the plurality of drive members is rotatably affixed to one of the plurality of mounting tabs of the telescoping member and longitudinally movable within one of the plurality of mounting tabs of the raised member such that rotation of the drive member causes the telescoping member to move between the retracted position and the extended position.

19. The mud ring kit according to claim 18, wherein each of the plurality of mounting tabs extending from the raised wall is substantially perpendicular to the raised wall.

20. The mud ring kit according to claim 18, wherein the raised member is monolithically formed into the base member or secured to the base member.

21. The mud ring kit according to claim 18, wherein each mounting tab extending from the raised wall includes an aperture to receive at least a portion of one of the plurality of drive members.

22. The mud ring kit according to claim 18, wherein the telescoping member comprises a single monolithic structure or at least two interlinked members.

23. The mud ring kit according to claim 18, wherein each of the plurality of mounting tabs extending from the circular wall is substantially perpendicular to the circular wall.

24. The mud ring kit according to claim 18, wherein each mounting tab extending from the circular wall includes an aperture to receive at least a portion of one of the plurality of drive members.

25. The mud ring kit according to claim 18, wherein each of the plurality of drive members comprises a fastener.

26. The mud ring kit according to claim 18, wherein the circular wall includes a plurality of protective members wherein one of the plurality of protective members is positioned in proximity to one of the mounting tab pairs.

27. The mud ring kit as recited in claim 18, wherein the plurality of mounting tabs of the raised member extend from above a lower edge of the raised wall and the plurality of mounting tabs of the telescoping member extend from an upper portion of the circular wall.

* * * * *